United States Patent [19]

Ogawa et al.

[11] Patent Number: 4,833,871
[45] Date of Patent: May 30, 1989

[54] APPARATUS FOR INSERTING OPTICAL FIBERS INTO A SPACER HAVING SPIRAL GROOVES

[75] Inventors: Satoshi Ogawa; Masanori Fujikawa; Masakazu Watanabe, all of Kanagawa, Japan

[73] Assignee: Sumitomo Electric Industries, Ltd., Osaka, Japan

[21] Appl. No.: 271,581

[22] Filed: Nov. 15, 1988

[30] Foreign Application Priority Data

Nov. 20, 1987 [JP] Japan .................................. 62-291881

[51] Int. Cl.[4] .......................... G02B 6/10; G02B 6/04; H01P 11/00; H01B 11/22
[52] U.S. Cl. ............................................. 57/6; 57/9; 57/13; 57/293; 57/352; 350/96.23
[58] Field of Search .................... 57/6, 9, 3, 13-15, 57/19, 293, 294, 352; 350/96.23, 96.24

[56] References Cited

U.S. PATENT DOCUMENTS

| 4,309,864 | 1/1982 | Hulin | 57/6 |
| 4,388,799 | 6/1983 | Vives | 57/352 X |
| 4,446,686 | 5/1984 | Panuska et al. | 57/9 X |
| 4,483,134 | 11/1984 | McKay et al. | 57/6 X |
| 4,497,164 | 2/1985 | Dotti et al. | 57/6 |
| 4,620,412 | 11/1986 | Portinari | 57/6 |
| 4,706,449 | 11/1987 | Akre | 57/13 X |
| 4,757,675 | 7/1988 | Oglesby et al. | 57/6 |

Primary Examiner—John Petrakes
Attorney, Agent, or Firm—Cushman, Darby & Cushman

[57] ABSTRACT

An apparatus and method for inserting optical fibers into a spacer having spiral grooves to produce a spacer type optical fiber cable wherein a torsional force detecting device is formed integrally with the optical fiber gathering device for inserting optical fibers into the spiral grooves. The torsional force exerted on the device by the spacer is detected by a tension/compression measuring device and the axial speed of the spacer is controlled in response to the measured torsional force so as to reduce the torsional force to zero.

7 Claims, 3 Drawing Sheets

APPARATUS FOR INSERTING OPTICAL FIBERS INTO A SPACER HAVING SPIRAL GROOVES

BACKGROUND OF THE INVENTION

1. Field of the Invention

This invention relates to a method of inserting optical fibers into spiral grooves provided in a spacer in the production of a spacer type optical fiber cable.

2. Description of the Related Art

FIG. 4 shows an example of a spacer type optical fiber cable. In this type of cable 1 four spiral grooves 4a, 4b, 4c and 4d are formed in the peripheral surface of a spacer 3 having an anti-tension member 2 at its center. The spiral grooves 4a, 4b, 4c and 4d extend longitudinally along the spacer 3 with a predetermined pitch. Optical fibers 5a, 5b 5c and 5d are provided in grooves 4a, 4b, 4c and 4d.

A production line for producing the spacer type optical fiber cable 1 will now be described with reference to the schematic illustration in FIG. 5. The spacer is drawn out from a supply bobbin I and to the right by means of a drawing capstan III. The optical fibers 5a, 5b, 5c and 5d are inserted into the spiral grooves 4a, 4b, 4c and 4d of the spacer 3 by means of an optical fiber gathering device II (described in detail below). The spacer 3 is then wound onto a winding bobbin IV through the drawing capstan III. The supply bobbin I, the drawing capstan III, and the winding bobbin IV all rotate in the same direction at a certain speed by means of a main motor (not shown). The optical fibers 5a through 5d are spirally inserted into the grooves 4a through 4d of the spacer 3 by the effect of the rotation, respectively.

The optical fiber cable gathering device II will now be described with reference to FIG. 6. The device includes stationary lay plates 7 and 8 arranged in series with a space therebetween. These lay plates 7 and 8 have spacer inserting holes 7a and 8a formed in the center thereof, respectively. The spacer 3 is inserted into the spacer inserting holes 7a and 8a and is moved to the right (in the direction indicated by arrow A) as it is being rotated. Hereinafter, movement will be described as upstream or downstream with respect to this moving direction A. Four groove pins 10 in the form of projections are provided in the inner peripheral surface of the lay plate 7. The tips of the groove pins 10 are in the grooves 4a through 4d, thereby allowing the optical fibers 5a through 5d to be positively disposed in these grooves. Further, each of the lay plates 7 and 8 has four fiber guide holes 7b and 8b, respectively. The optical fibers 5a, 5b, 5c and 5d supplied from respective reels 9a, 9b, 9c and 9d pass through these fiber guide holes 7b and 8b and are inserted into the grooves 4a, 4b, 4c and 4d at a point downstream of the lay plate 7.

The pitch of the spiral grooves 4a through 4d provided in the spacer 3 is not always constant since variations are involved to some degree during the production process. Thus, it is necessary to measure the groove pitch P in order to correct any deviation from the preset groove pitch. Accordingly, a spiral groove position detecting device VI is conventionally provided on the upstream side of the optical fiber gathering device II, as shown in FIG. 6.

The spiral groove position detecting device VI is composed of an angle detection gear 11 and a potentiometer 12. The angle detection gear 11 is provided in a housing 13 in such a manner that it can rotate around the spacer 3 and has a groove detection pin 14 provided in the inner peripheral surface of the angle detection gear 11. This groove detection pin 14 is inserted into the spiral groove 4a in such a manner that the angle detection gear 11 is rotated in accordance with the positional deviation of the groove 4a around the axis of spacer 3. The potentiometer 13 outputs a pin position signal with a magnitude corresponding to the rotation angle of the angle detection gear 11. The deviation in rotation angle is calculated based upon this signal by an arithmetic unit (CPU). A capstan motor M of the capstan III shown in FIG. 5 is controlled in accordance with the result of this calculation.

While the detecting device VI can compensate somewhat for deviations in pitch, this conventional device has a low control accuracy. More particularly, as noted above, the groove pins 10 provided in the stationary lay plate 7 of the optical fiber gathering device II are disposed in the spiral grooves 4a through 4d so as to abut against the same. The reaction force generated by this abutment exerts a torsional force on the spacer 3, thereby damaging the spacer 3. This contributes to the low control accuracy. However, because the groove position detecting device VI is spaced from and upstream of gathering device II, detecting device VI cannot accommodate for the inaccuracy caused by the torsional force generated by the gathering device II, being capable only of measuring the rotational angle to detect deviations in pitch.

SUMMARY OF THE INVENTION

In view of the foregoing, it is an object of the present invention to provide an optical fiber inserting method in which no torsional force is generated in the spacer at the time the optical fibers are inserted.

To obtain this object, an apparatus for inserting optical fibers into a spacer having spiral grooves by axially moving the spacer while rotating it around its axis is provided wherein the pins to be inserted into the grooves of the spacer are provided at substantially the same position as that at which the optical fibers are gathered and inserted into the grooves and wherein the torsional force exerted on the pins by the inside surfaces of the grooves is measured, the moving speed of the spacer being controlled in such a manner that the torsional force is zero.

With the above-described apparatus and method, any deviation generated in the spacer groove pitch causes the pins to receive a torsional force in the circumferential direction from the inside surfaces of the groove. This deviation in groove pitch can be absorbed by varying the spacer speed in the axial direction.

DETAILED DESCRIPTION OF THE PRESENTLY PREFERRED EMBODIMENT

The apparatus formed in accordance with this invention will now be described with reference to the production of a spacer type optical fiber cable 1 of the type described above. Since this embodiment employs some parts used in the conventional type device, the description of the corresponding components will be omitted.

Figure 1:
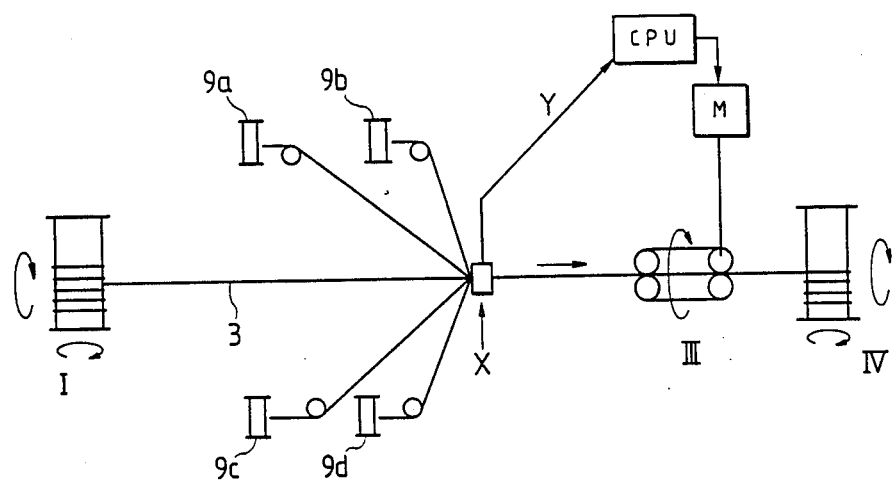
FIG. 1 is a schematic view of the optical fiber cable production line in accordance with this invention.

Instead of the conventionally used spiral groove position detecting device VI, the present embodiment employs, as shown in FIG. 1, a torsional force detecting device for measuring the torsional force of the spacer 3.

Figure 2:
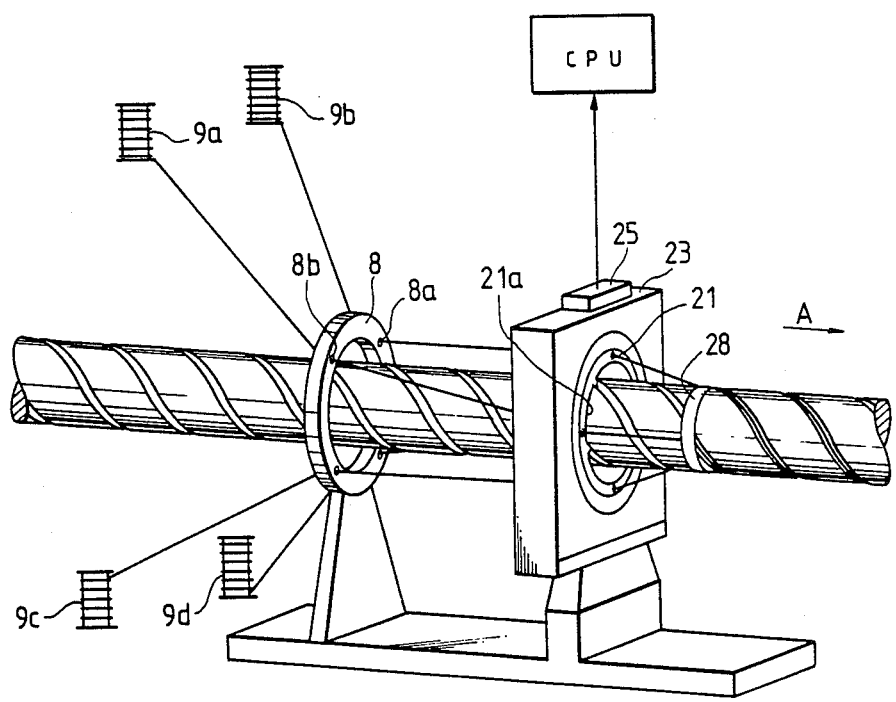
FIG. 2 is a perspective view of the detecting/gathering device of the invention.

In this embodiment, this torsional force detecting device is formed integrally with the optical fiber gathering device for inserting the optical fibers 5a through 5d into the spiral grooves 4a through 4d to define a "detecting/gathering device" X. As shown in FIGS. 2 and 3, detecting/gathering device X includes a lay plate 21 similar to that in the conventional optical fiber gathering device II. This lay plate 21 is rotatably supported by a base frame 23 through a bearing 22. The torsional force exerted on the lay plate 21 by the spacer 3 is detected by a tension/compression measuring device or load cell 25. Thus detecting/gathering device X provides the double function of gathering the optical fibers and detecting the torsional force.

Figure 3A:
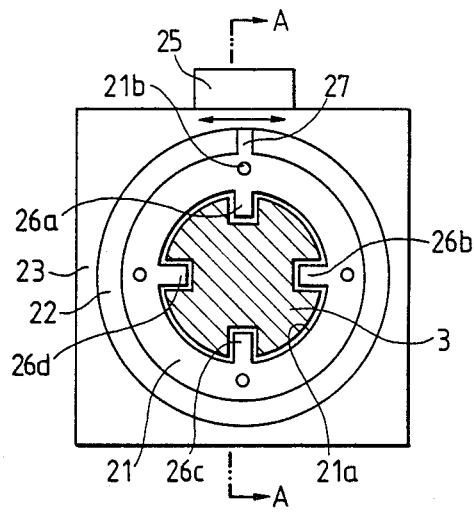
FIGS. 3(a) and 3(b) are a front view and a sectional view taken along the line A—A, respectively, of the detecting/gathering device.
Figure 3B:
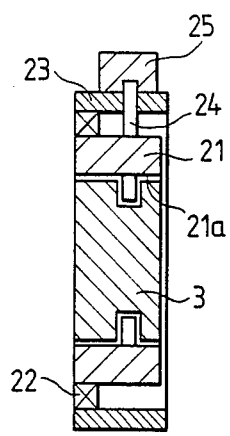
Figure 4:
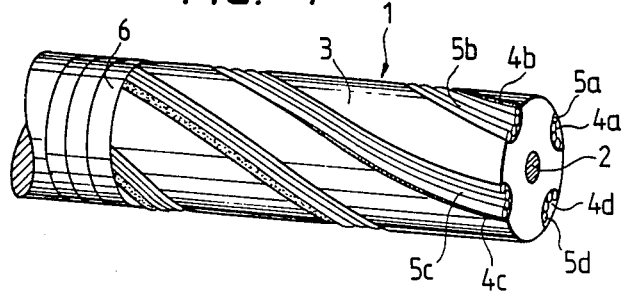
FIG. 4 is a perspective view of the optical fiber cable.
Figure 5:
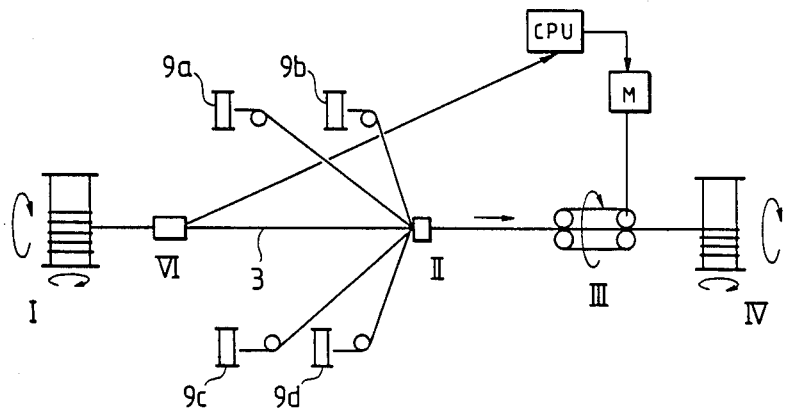
FIG. 5 is schematic view of a conventional optical fiber cable production line.
Figure 6:
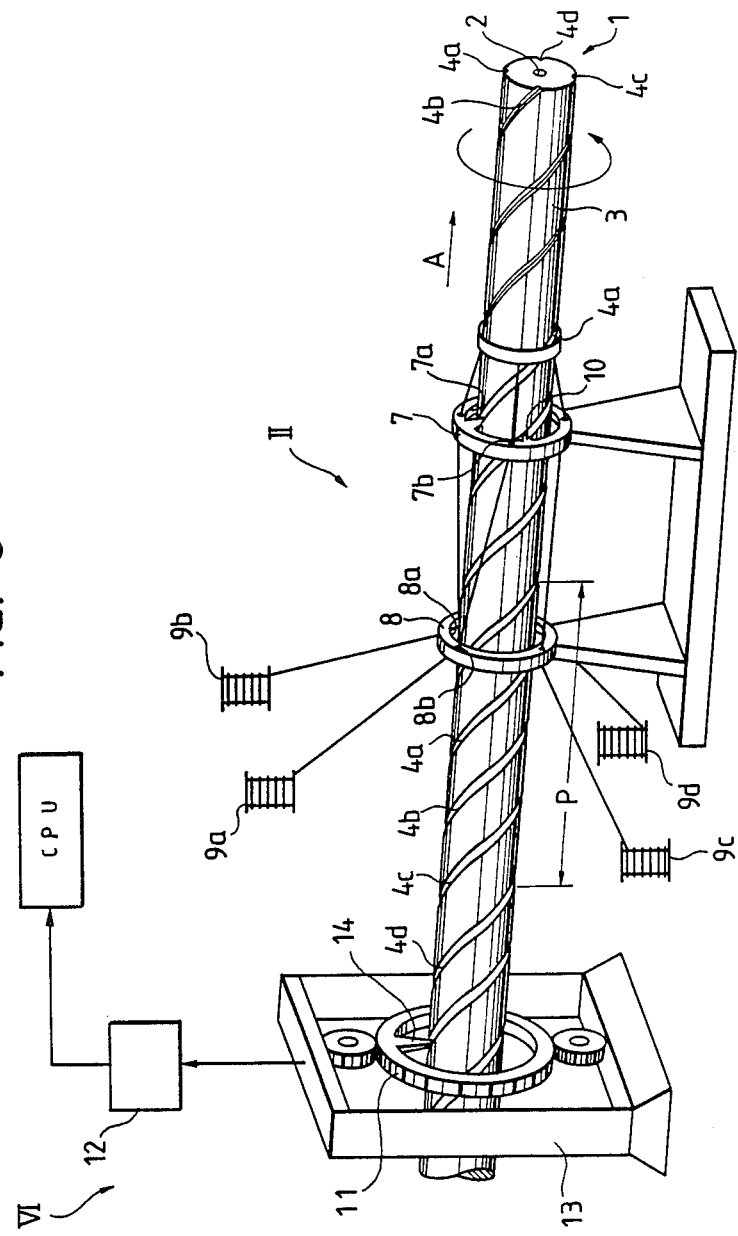
FIG. 6 is a schematic perspective view of a conventional optical fiber gathering device and a conventional detecting device.

The detecting/gathering device X will now be described in detail with reference to FIGS. 3(a) and 3(b). Groove detecting pins 26a, 26b, 26c and 26d whose tips are to be inserted into the grooves 4a, 4b, 4c and 4d of the spacer 3 protrude from the inner peripheral surface of the spacer guide hole 21a in the lay plate 21. In other words, these groove detecting pins 26a through 26d are continuously disposed in the grooves 4a, 4b, 4c and 4d of the spacer 3 which is moved in the direction A shown in FIG. 2 while being rotated. If any positional deviation is generated in the spiral grooves 4a through 4d, a torsional force is applied to the groove detecting pins which causes the groove detecting pins to be rotated. The optical fibers 5a through 5d which have passed through the optical fiber guide holes 21b are held by a stationary holding ring 28 provided on the downstream side of the detecting/gathering device X, and are inserted into the grooves 4a through 4d.

A torsional force transmitting pin 27 in the form of a projection is provided on the outer peripheral surface of the lay plate 21, as shown in FIG. 3. Since this torsional force transmitting pin 27 is connected to the load cell 25, the torsional force applied to the lay plate 21 is measured by load cell 25. Thus, when the groove detecting pins 26a through 26d of the lay plate 21 provided in the detecting/gathering device X receive a torsional force from the spacer 3 and the lay plate 21 is rotated, the movement of the lay plate 21 is transmitted to the load cell 25 through the torsional force transmitting pin 27 and is detected by this load cell 25 as a torque (kg·cm).

As shown in FIG. 1, the torque detected by load cell 25 is transmitted to the arithmetic unit (CPU) as a signal Y. The arithmetic unit then controls the drawing capstan motor M so that the torque is reduced to zero. Thus, the linear speed of the spacer 3 is controlled and the position of the spiral grooves 4a through 4d at the optical fiber gathering point is kept constant.

As described above, any positional deviation of the spiral grooves 4a through 4d in the optical fiber gathering section is eliminated by making the signal Y received by the load cell 25 zero. Thus whenever any deviation in pitch of the grooves 4a through 4d of the spacer 3 causes the groove detecting pins 26a through 26d of the lay plate 21 in the detecting/gathering device X to receive torsional force, the linear speed of the spacer is controlled so that the torsional force is reduced to zero. Accordingly, insertion of the optical fibers can be effected, with no torsional force being exerted on the spacer and the optical fibers can always be properly inserted into the spacer, thereby making it possible to provide uniform optical fiber cables.

We claim:

1. A production assembly for producing a spacer type optical fiber cable comprising:
   means defining a conveyance path for an elongated spacer member;
   means for mounting a supply of an elongated spacer for cabling the spacer type optical fiber cable mounted along said conveyance path, said spacer having a plurality of spiral grooves defined on the exterior surface thereof;
   means for drawing said spacer along said conveyance path from said supply of spacer;
   means for mounting a supply of optical fibers along said conveyance path;
   detecting/gathering means for guiding optical fibers from said source of optical fiber and gathering said optical fibers to said spacer so that said fibers are inserted into said grooves as said spacer is drawn along said conveyance path, including at least one pin element inserted in at least one of said grooves, said detecting/gathering means further including means for measuring a torsional force applied to said at least one pin element; and
   means for controlling said means for drawing in response to said detected torsional force so that said torsional force is reduced to zero.

2. An assembly as in claim 1, wherein said means for detecting and gathering includes:
   a housing; and
   a ring element mounted within said housing, said ring element having a central aperture sized to receive said spacer therethrough and a plurality of said pin elements defined about the interior periphery of said aperture, said pin elements being sized and spaced so as to be insertable into the grooves of said spacer, said ring element being rotatable within said housing.

3. An assembly as in claim 2, wherein said means for measuring a torsional force includes a projection defined on the outer peripheral surface of said ring element and a tension/compression measuring device mounted to said housing and operatively coupled to said projection so that a torsional force applied to the ring element is measured by the tension/compression measuring device, said tension/compression measuring device being operatively coupled to said means for drawing so that said means for drawing are controlled in response to the measured torque so as to reduce the torque to zero.

4. An apparatus as in claim 1, wherein there are four pin elements and four corresponding grooves in said spacer.

5. A method of producing a spacer type optical fiber cable comprising:
   providing a conveyance path for an elongated spacer member;

mounting a supply of an elongated spacer for cabling the spacer type optical fiber cable along said conveyance path, said spacer having a plurality of spiral grooves defined on the exterior surface thereof;

drawing said spacer along said conveyance path from said supply of spacer with a means for drawing;

mounting a supply of optical fibers along said conveyance path;

providing a detecting/gathering means for guiding optical fibers from said source of optical fiber and gathering said optical fibers to said spacer so that said fibers are inserted into said grooves as said spacer is drawn along said conveyance path, including at least one pin element inserted in at least one of said grooves, said detecting/gathering means further including means for measuring a torsional force applied to said at least one pin element;

guiding optical fibers from said source of optical fiber and gathering said optical fibers to said spacer with said detecting/gathering means so that said fibers are inserted into said grooves as said spacer is drawn along said conveyance path;

detecting and measuring a torsional force applied to said at least one pin element with said detecting-/gathering means; and controlling said step of drawing in response to said detected torsional force so that said torsional force is reduced to zero.

6. A method as claimed in claim 5, wherein said step of providing a detecting/gathering means includes providing a housing and providing a ring element mounted within said housing, said ring element having a central aperture sized to receive said spacer therethrough and a plurality of said pin elements defined about the interior periphery of said aperture, said pin elements being sized and spaced so as to be insertable into the grooves of said spacer, said ring element being rotatable within said housing.

7. A method as claimed in claim 6, wherein said step of measuring a torsional force includes providing a projection on the outer peripheral surface of said ring element and providing a tension/compression measuring device in said housing and operatively coupled to said projection so that a torsional force applied to the ring element is measured by the tension/compression measuring device, said tension/compression measuring device being operatively coupled to said means for drawing so that said step of drawing is controlled in response to the measured torque so as to reduce the torque to zero.

* * * * *